United States Patent
Koorapaty et al.

(10) Patent No.: US 6,871,061 B1
(45) Date of Patent: Mar. 22, 2005

(54) SYSTEMS, METHODS AND TERMINALS THAT OBTAIN COARSE POSITION INFORMATION FROM SATELLITE RADIOTELEPHONE SYSTEMS

(75) Inventors: Havish Koorapaty, Raleigh, NC (US); Peter D. Karabinis, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 1062 days.

(21) Appl. No.: 09/063,720

(22) Filed: Apr. 21, 1998

(51) Int. Cl.⁷ .................. H04M 11/04; H04B 7/00; H04B 7/185; H04Q 7/20; G01S 5/02
(52) U.S. Cl. ............... 455/404.2; 342/357.1; 701/213; 455/517
(58) Field of Search .................. 342/357.01, 363, 342/357.06, 457, 357.02; 455/517, 427, 414.02, 404.2; 701/213; 370/203

(56) References Cited

U.S. PATENT DOCUMENTS

| | | | | |
|---|---|---|---|---|
| 4,799,062 A | * | 1/1989 | Sanderford et al. | 342/450 |
| 5,583,513 A | * | 12/1996 | Cohen | 342/357 |
| 5,631,898 A | * | 5/1997 | Dent | 370/203 |
| 5,742,908 A | * | 4/1998 | Dent | 455/517 |
| 5,774,829 A | * | 6/1998 | Cisneros et al. | 701/213 |
| 5,796,365 A | * | 8/1998 | Lewis | 342/357 |
| 5,926,133 A | * | 7/1999 | Green, Jr. | 342/363 |

FOREIGN PATENT DOCUMENTS

JP  09304501  * 11/1997

OTHER PUBLICATIONS

European Telecommunications Standards Institute Technical Specification GSM 03.03, Oct. 1993.*
U.S. Appl. No. 08/925,566, filed Sep. 08, 1997, Horton et al.
U.S. Appl. No. 08/950,690, filed Oct. 15, 1997, Camp et al.
U.S. Appl. No. 08/989,508, filed Dec. 12, 1997, Camp et al.

* cited by examiner

Primary Examiner—William Cumming
(74) Attorney, Agent, or Firm—Myers Bigel Sibley & Sajovec (57) ABSTRACT

A mobile radiotelephone terminal having a satellite radiotelephone and a Global Positioning System (GPS) obtains a coarse position of the mobile radiotelephone terminal from satellite radiotelephone system communications. The GPS receiver uses the coarse position to determine an accurate position of the mobile radiotelephone terminal. Accordingly, by obtaining a coarse position from the satellite radiotelephone systems communications, the computation time for the GPS receiver to compute an accurate position of the mobile radiotelephone terminal may be reduced. By allowing a reduction of computation time by the GPS receiver, an accurate position may be obtained more quickly and/or with reduced power.

18 Claims, 5 Drawing Sheets

SYSTEMS, METHODS AND TERMINALS THAT OBTAIN COARSE POSITION INFORMATION FROM SATELLITE RADIOTELEPHONE SYSTEMS

FIELD OF THE INVENTION

The present invention generally relates to wireless communications systems and methods, and more particularly to wireless mobile terminals, systems and methods

BACKGROUND OF THE INVENTION

Wireless communication systems are commonly employed to provide voice and data communications to a plurality of subscribers within a prescribed geographic area. For example, analog cellular radiotelephone systems, such as those designated AMPS, ETACS, NMT-450, and NMT-900, have been deployed successfully throughout the world. Recently, digital cellular radiotelephone systems such as those designated IS-54B (and its successor IS-136) in North America and GSM in Europe have been introduced and are currently being deployed. These systems, and others, are described, for example, in the book entitled *Cellular Radio Systems*, by Balston, et al., published by Artech House, Norwood, Mass. (1993). In addition to the above systems, an evolving system referred to as Personal Communication Services (PCS) is being implemented. Examples of current PCS systems include those designated IS-95, PCS-1900, and PACS in North America, DCS-1800 and DECT in Europe, and PHS in Japan. These PCS systems operate at the 2 gigahertz (GHz) band of the radio spectrum, and are typically being used for voice and high bit-rate data communications.

Figure 1:
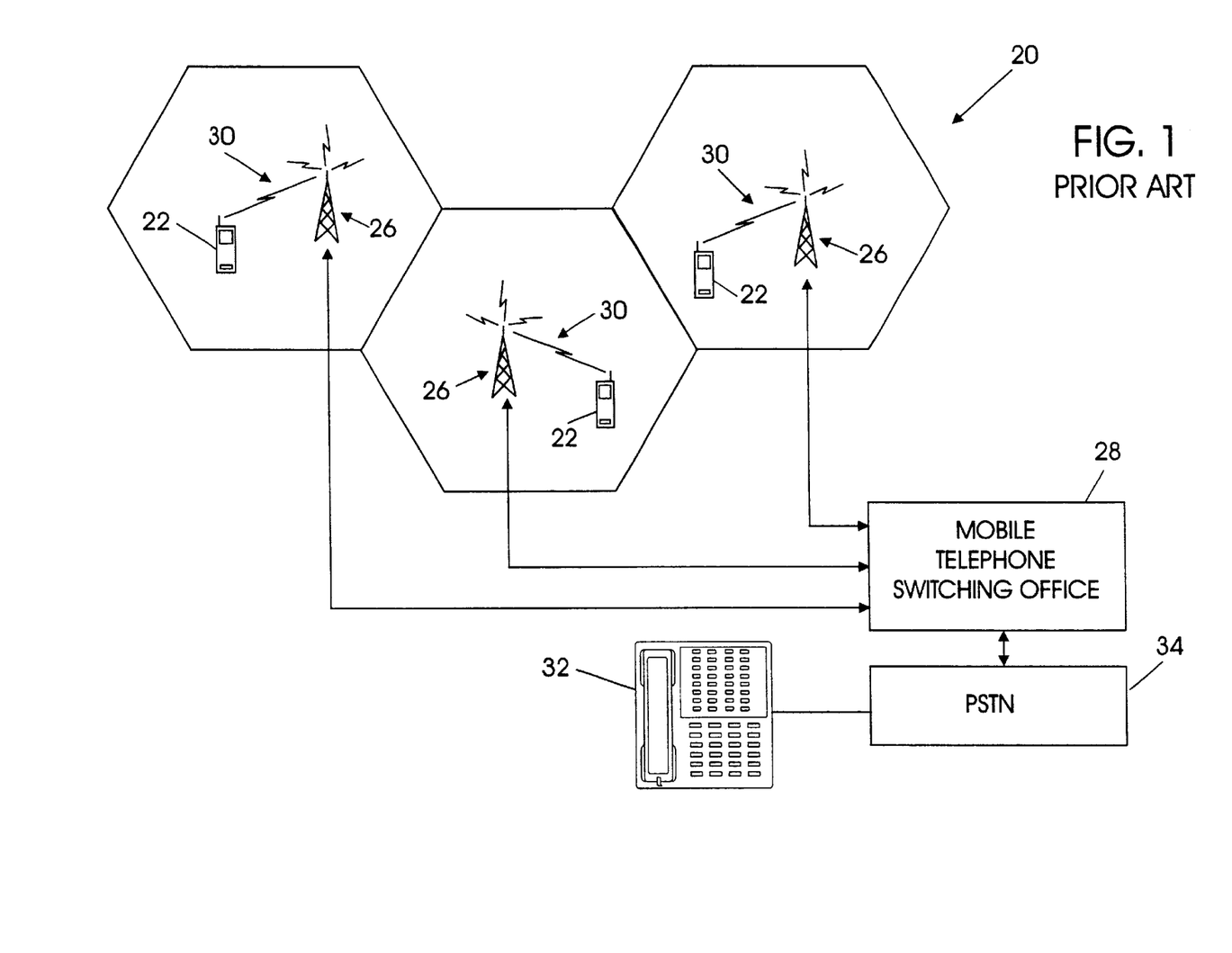
FIG. 1 illustrates a conventional terrestrial (cellular) wireless communication system.

FIG. 1 illustrates a conventional terrestrial wireless communication system 20 that may implement any one of the aforementioned wireless communications standards. The wireless system may include one or more wireless mobile terminals 22 that communicate with a plurality of cells 24 served by base stations 26 and a Mobile Telephone Switching Office (MTSO) 28. Although only three cells 24 are shown in FIG. 1, a typical cellular radiotelephone network may comprise hundreds of cells, may include more than one MTSO 28 and may serve thousands of wireless mobile terminals 22.

The cells 24 generally serve as nodes in the communication system 20, from which links are established between wireless mobile terminals 22 and an MTSO 28, by way of the base stations 26 servicing the cells 24. Each cell 24 will have allocated to it one or more dedicated control channels and one or more traffic channels. The control channel is a dedicated channel used for transmitting cell identification and paging information. The traffic channels carry the voice and data information. Through the communication system 20, a duplex radio communication link 30 may be effected between two wireless mobile terminals 22 or between a wireless mobile terminal 22 and a landline telephone user 32 via a Public Switched Telephone Network (PSTN) 34. The base station 26 generally handles the radio communications between the base station 26 and the wireless mobile terminal 22. In this capacity, the base station 26 may function as a relay station for data and voice signals.

Figure 2:
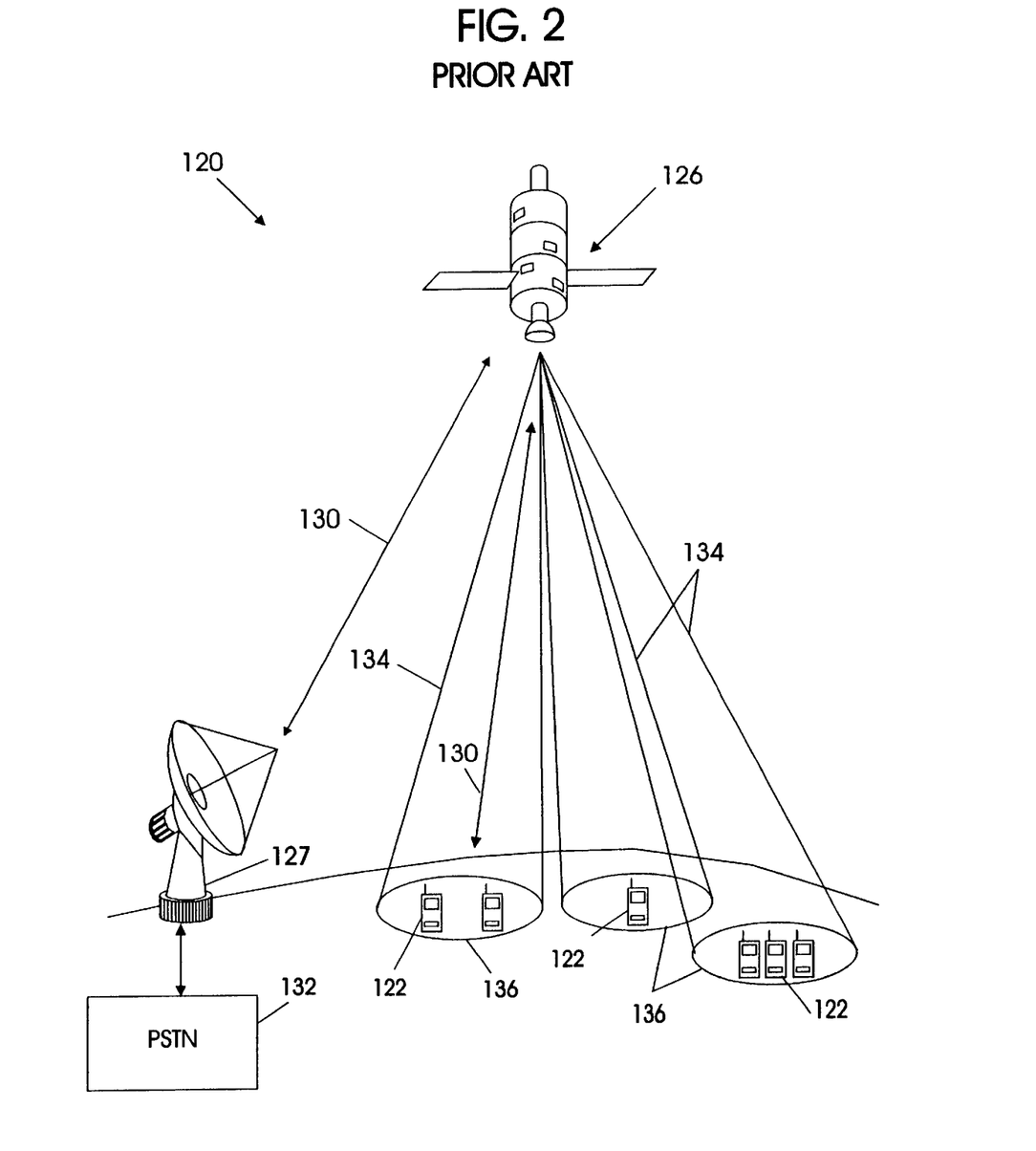
FIG. 2 illustrates a conventional celestial (satellite) wireless communication system.

FIG. 2 illustrates a conventional celestial (satellite) communication system 120. The celestial wireless communication system 120 may be employed to perform similar functions to those performed by the conventional terrestrial wireless communication system 20 of FIG. 1. In particular, the celestial wireless communication system 120 typically includes one or more satellites 126 that serve as relays or transponders between one or more earth stations 127 and satellite wireless mobile terminals 122. The satellite 126 communicates with the satellite wireless mobile terminals 122 and earth stations 127 via duplex communication links 130. Each earth station 127 may in turn be connected to a PSTN 132, allowing communications between the wireless mobile terminals 122, and communications between the wireless mobile terminals 122 and conventional terrestrial wireless mobile terminals 22 (FIG. 1) or landline telephones 32 (FIG. 1).

The celestial wireless communication system 120 may utilize a single antenna beam covering the entire area served by the system, or as shown in FIG. 2, the celestial wireless communication system 120 may be designed such that it produces multiple, minimally-overlapping beams 134, each serving a distinct geographical coverage area 136 within the system's service region. A satellite 126 and coverage area 136 may serve a function similar to that of a base station 26 and cell 24, respectively, of the terrestrial wireless communication system 20.

Thus, the celestial wireless communication system 120 may be employed to perform similar functions to those performed by conventional terrestrial wireless communication systems. In particular, a celestial radiotelephone communication system 120 may have particular application in areas where the population is sparsely distributed over a large geographic area or where rugged topography tends to make conventional landline telephone or terrestrial wireless infrastructure technically or economically impractical.

As the wireless communication industry continues to advance, other technologies will most likely be integrated within these communication systems in order to provide value-added services. One such technology being considered is a Global Positioning System (GPS). Therefore, it would be desirable to have a wireless mobile terminal with a GPS receiver integrated therein. It will be understood that the terms "global positioning system" or "GPS" are used to identify any spaced-based system that measures positions on earth, including the GLONASS satellite navigation system in Europe.

Figure 3:
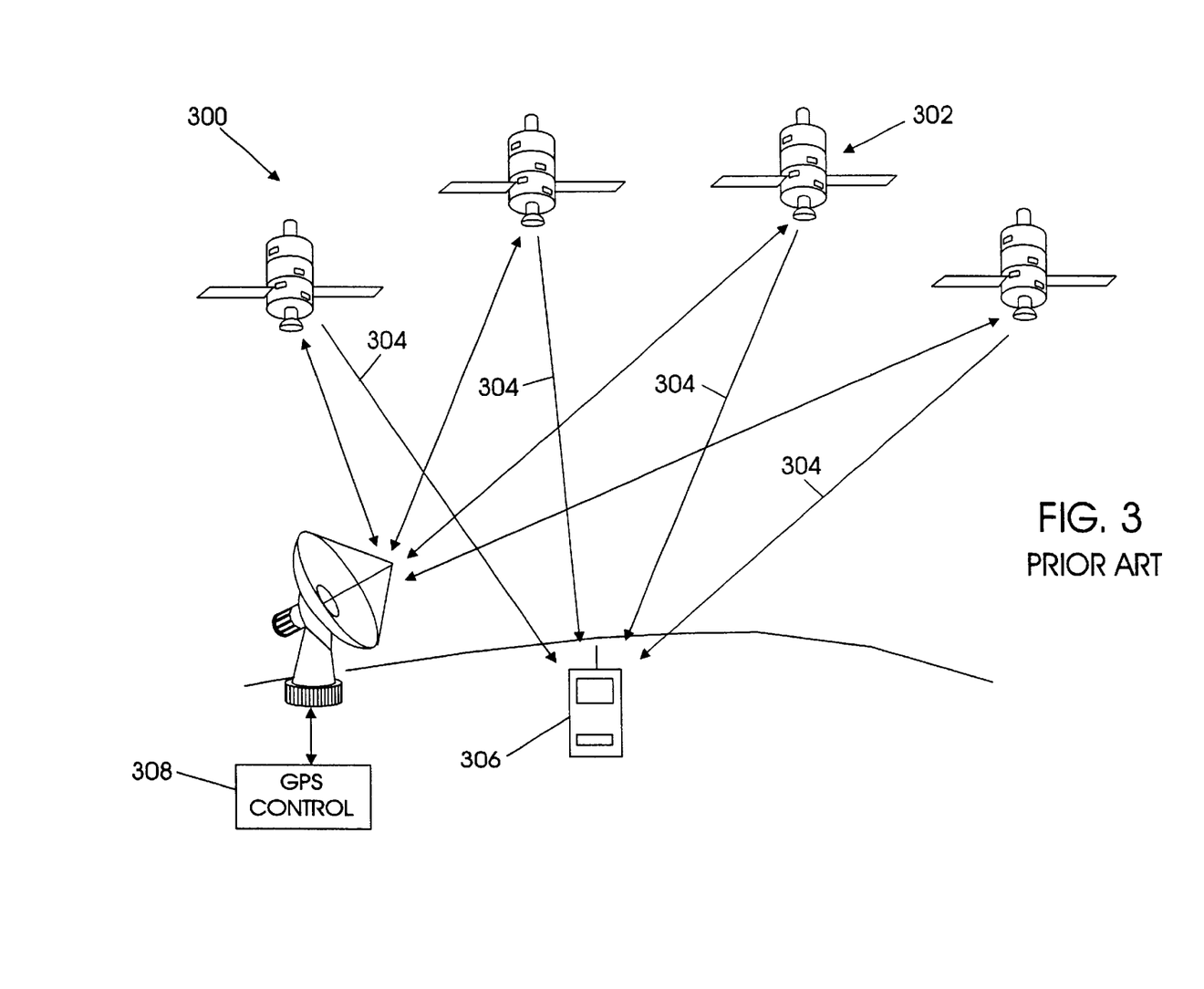
FIG. 3 illustrates a conventional global positioning system (GPS).

A GPS system 300 is illustrated in FIG. 3. As is well known to those having skill in the art, GPS is a space-based triangulation system using satellites 302 and computers 308 to measure positions anywhere on the earth. GPS was first developed by the United States Department of Defense as a navigational system. Compared to other land-based systems, GPS may be unlimited in its coverage, may provide continuous 24-hour coverage regardless of weather conditions, and may be highly accurate. While the GPS technology that provides the greatest level of accuracy has been retained by the government for military use, a less accurate service has been made available for civilian use.

In operation, a constellation of 24 satellites 302 orbiting the earth continually emit a GPS radio frequency signal 304 at a predetermined chip frequency. A GPS receiver 306, e.g., a hand-held radio receiver with a GPS processor, receives the radio signals from the closest satellites and measures the time that the radio signals take to travel from the GPS satellites to the GPS receiver antenna. By multiplying the travel time by the speed of light, the GPS receiver can calculate a range for each satellite in view. From additional information provided in the radio signal from the satellites, including the satellite's orbit and velocity and correlation to its onboard clock, the GPS processor can calculate the position of the GPS receiver through a process of triangulation.

It is known to share reference frequency signals in a wireless mobile terminal, between a wireless transceiver and a GPS transceiver. See copending application Ser. No. 08/925,566 to Horton et al., entitled "Systems and Methods for Sharing Reference Frequency Signals Within a Wireless Mobile Terminal Between a Wireless Transceiver and a Global Positioning System Receiver", filed Sep. 8, 1997 and assigned to the assignee of the present application, the disclosure of which is hereby incorporated herein by reference. It is also known to combine a GPS receiver and a wide bandwidth radiotelephone terminal. See application Ser. No. 08/989,508 to Camp et al. entitled "Combined GPS and Wide Bandwidth Radiotelephone Terminals and Methods", filed on Dec. 12, 1997 and assigned to the assignee of the present application, the disclosure of which is hereby incorporated herein by reference. Finally, it is also known to reduce GPS receiver code shift search space for a cellular telephone system, as described in application Ser. No. 08/950,690 to Camp et. al. entitled "Reduced Global Positioning System Receiver Code Shift Search Space for Cellular Telephone System", filed on Oct. 15, 1997 and assigned to the assignee of the present invention, the disclosure of which is hereby incorporated herein by reference.

SUMMARY OF THE INVENTION

The present invention includes mobile radiotelephone terminals having a satellite radiotelephone and a Global Positioning System (GPS) receiver, wherein the satellite radiotelephone obtains a coarse position of the mobile radiotelephone terminal from satellite radiotelephone system communications. The GPS receiver uses the coarse position to determine an accurate position of the mobile radiotelephone terminal. Accordingly, by obtaining a coarse position from the satellite radiotelephone systems communications, the computation time for the GPS receiver to compute an accurate position of the mobile radiotelephone terminal may be reduced. By allowing a reduction of computation time by the GPS receiver, an accurate position may be obtained more quickly and/or with reduced power.

More specifically, the satellite radiotelephone may obtain a coarse position of the mobile radiotelephone terminal by identifying a cell in the satellite radiotelephone system, within which the mobile radiotelephone terminal is located. This may provide a coarse position, but the position may be very coarse because the satellite radiotelephone system may use cells that are quite large. According to another aspect of the present invention, the satellite radiotelephone obtains a coarse position of the mobile radiotelephone terminal using time of arrival information, time difference of arrival information, and/or signal strength information that is obtained from satellite radiotelephone system communications.

In a particular embodiment of the present invention, the satellite radiotelephone obtains a coarse position of the mobile radiotelephone terminal by transmitting signals from the satellite radiotelephone to the satellite radiotelephone system. If the satellite radiotelephone system is a low orbit satellite system, three or more satellites may measure the time of arrival of the mobile terminal signal. Alternatively, the satellite radiotelephone may measure the time of arrival of satellite signals. A ground station, a satellite or the mobile radiotelephone may then compute the coarse position from these measurements. If the computation is performed outside the mobile terminal, the coarse position is then sent to the mobile terminal. The GPS receiver uses the coarse information to determine an accurate position of the mobile radiotelephone terminal.

Alternatively, if a geostationary satellite system is used, the mobile radiotelephone can measure the received power from multiple antenna beams. From these measurements, the mobile radiotelephone, a satellite and/or a ground station can compute a coarse position. If a satellite or ground station computes the coarse position, the coarse position is then sent to the mobile radiotelephone terminal. This coarse position is then provided to the GPS receiver for use in determining an accurate position.

According to another aspect of the present invention, the satellite radiotelephone obtains a coarse position of the mobile radiotelephone terminal by repeatedly determining coarse positions of increasing accuracy from satellite radiotelephone system communications. For example, the satellite radiotelephone may obtain a coarse position by determining a first coarse position from the satellite radiotelephone system communications, and by determining a second coarse position that is more accurate than the first coarse position, from the first coarse position and from the satellite radiotelephone system communications. The GPS receiver then uses at least one of the coarse positions, for example the second coarse position, to determine an accurate position of the mobile radiotelephone terminal.

For example, the first coarse position may be obtained by identifying a cell in a satellite radiotelephone system in which the mobile radiotelephone terminal is located. A second coarse position may then be obtained by measuring the received signal strength in the cell or by performing time of arrival or time difference of arrival calculations using the search space of the cell, to thereby obtain the second coarse position that is more accurate than the first coarse position. This nested or repeated coarse position determination may also be used with other mobile radiotelephones, such as terrestrial cellular radiotelephones, and not only with satellite radiotelephones.

Position computation systems for mobile radiotelephone terminals that include a satellite radiotelephone transceiver and a GPS receiver include means for determining a coarse position from satellite positions that are transceived by the satellite radiotelephone transceiver. The coarse position determining means may be included in the mobile radiotelephone terminal, in one or more satellites, one or more ground stations and combinations thereof. Means are also included for providing a coarse position to the GPS receiver, the GPS receiver using the coarse position to determine an accurate position of the mobile radiotelephone terminal. The coarse position may be provided to the GPS receiver by internal communication with the satellite radiotelephone transceiver. The coarse position may be determined using any of the alternatives described above.

Position computation methods for a mobile radiotelephone terminal that includes a satellite radiotelephone and a GPS receiver include the step of determining a coarse position by the satellite radiotelephone from satellite radiotelephone system communications. The coarse position is provided from the satellite radiotelephone to the GPS receiver. The GPS receiver then uses the coarse position to determine an accurate position of the mobile radiotelephone terminal. The step of determining a coarse position may be implemented using any of the alternatives described above, or by using other alternatives. Accordingly, by obtaining a coarse position from satellite communications and providing the coarse position to the GPS receiver, accurate positions may be obtained at reduced power and/or reduced time.

DETAILED DESCRIPTION OF PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention provides mobile radiotelephone terminals, methods and systems that can reduce the search space to be explored by a mobile terminal in synchronizing to a GPS satellite signal, when the mobile terminal is in the coverage area of a satellite radiotelephone communication system. The invention uses coarse position information obtained from the satellite system. Different types of coarse position information may be used for different types of satellite radiotelephone systems. For low and medium earth orbit satellite systems with multiple satellites, the coarse position information may either be based on received signal strength (such as received power) from satellite signals, from satellite measurement of time of arrival (TOA) of mobile terminal signals or from TOA or time difference of arrival (TDOA) measurements of satellite signals. For geostationary systems, the information may be based on the received power of the satellite signals as measured by the mobile radiotelephone terminal. Other techniques for determining coarse position from satellite communications may be used.

Figure 4:
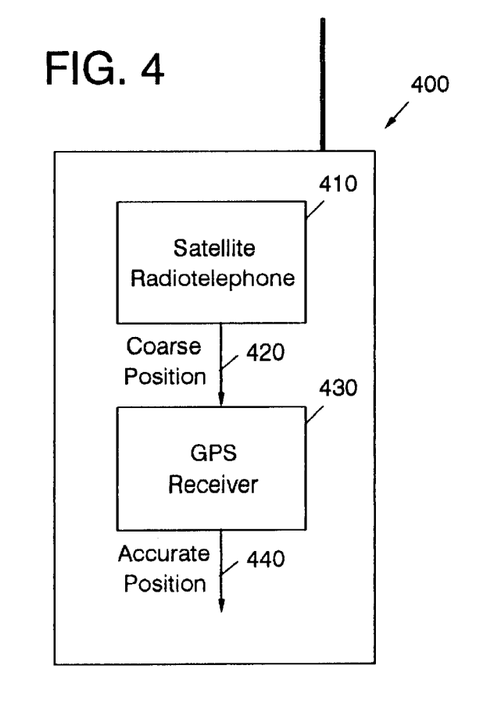
FIG. 4 is a block diagram of mobile radiotelephone terminals according to the present invention.

More specifically, referring to FIG. 4, a block diagram of mobile radiotelephone terminals according to the present invention is illustrated. It will be understood that mobile radiotelephone terminals 400 may be used in place of a satellite wireless mobile terminal 122 of FIG. 2 and a GPS receiver 306 of FIG. 3, at locations that are served by both a satellite radiotelephone communication system 120 (FIG. 2) and a GPS system 300 (FIG. 3).

As shown in FIG. 4, mobile radiotelephone terminal 400 includes a satellite radiotelephone 410 that obtains a coarse position 420 of the mobile radiotelephone terminal 400 from satellite radiotelephone system communications. A GPS receiver 430 within mobile radiotelephone terminal 400 uses the coarse position 420 to determine an accurate position 440 of the mobile radiotelephone terminal. The accurate position 440 may be displayed, or may be broadcast within the satellite radiotelephone communication system, or may be used for other purposes, as is conventional. It will also be understood that mobile radiotelephone terminal 400 may also include conventional user interface elements, such as keypads and displays and other electronic components known to those having skill in the art. Accordingly, satellite radiotelephone 400 obtains a coarse position 420 that is provided to GPS receiver 430 so that the GPS receiver 430 can determine an accurate position 440 using a reduced search space.

It will be understood by those having skill in the art that satellite radiotelephone 410 typically includes a satellite radiotelephone transmitter and receiver (transceiver). According to the invention, means are provided for determining a coarse position from satellite communications that are transceived (transmitted and/or received) by the satellite radiotelephone transceiver. Means are also provided to provide the coarse position 420 to the GPS receiver 430. The GPS receiver uses the coarse position 420 to determine an accurate position 440 of the mobile radiotelephone terminal.

As will be described, systems and methods according to the present invention may determine a coarse position entirely within mobile radiotelephone 400. Alternatively, the coarse position may be computed in one or more of the satellites, in one or more ground stations, at other locations, or combinations thereof. Coarse position determination may be obtained using special purpose hardware, general purpose computers that execute a stored program or combinations thereof.

Figure 5:
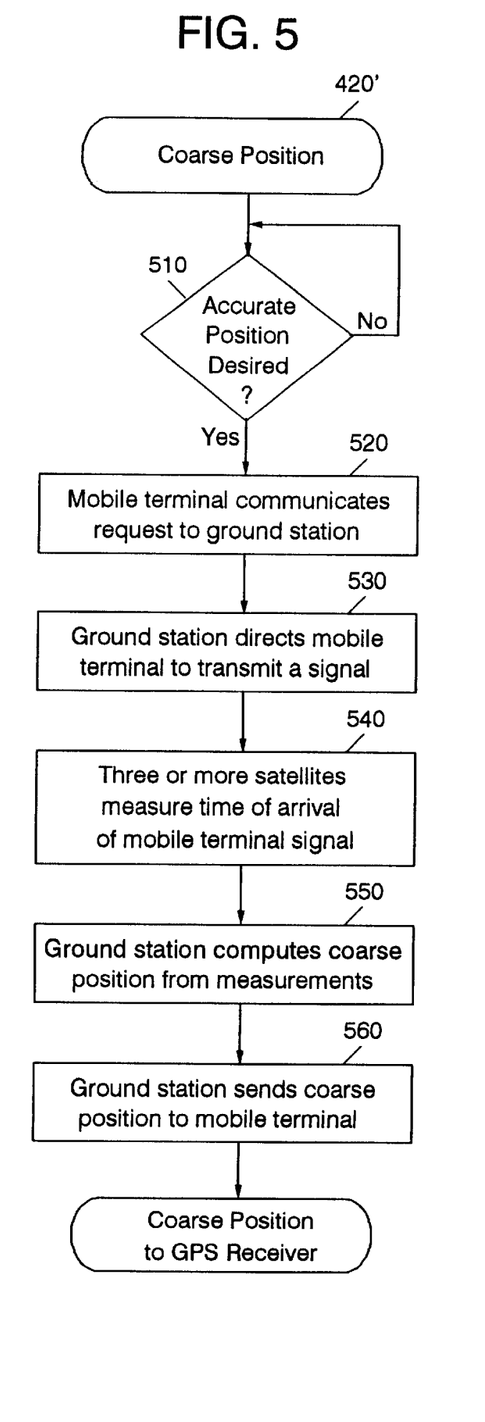
FIGS. 5, 6 and 7 illustrate first, second and third embodiments respectively for determining a coarse position of a mobile radiotelephone terminal according to the invention.

Referring now to FIG. 5, a first embodiment of systems and methods for determining a coarse position 420' of a mobile radiotelephone terminal 400 according to the invention will now be described. The systems and methods of FIG. 5 may be particularly amenable for use with satellite radiotelephone systems having low or medium orbit communications satellite, wherein the terminal 400 is in view of multiple satellites. In this embodiment, the position of the mobile terminal 400 can be obtained using time of arrival (TOA) or time difference of arrival (TDOA) techniques using the satellites of the satellite communication system.

As shown in FIG. 5, when an accurate position is desired at Block 510, either in response to a user request or a request that is transmitted to the mobile radiotelephone terminal 400 by the satellite communication system, the mobile terminal communicates the request to the ground station of the satellite communication system at Block 520. After the ground station alerts the satellites that are in view of the mobile radiotelephone terminal, the ground station directs the mobile terminal to transmit a signal at Block 530. At Block 540, three or more satellites measure the time of arrival of the mobile terminal signal. Alternatively, the mobile radiotelephone terminal can measure the time of arrival of satellite signals. At Block 550, the ground station computes the coarse position from these measurements. It will also be understood that this computation may be performed in the mobile terminal, in a satellite and/or elsewhere.

Finally, at Block 560, if the ground station computed the coarse position, it sends the coarse position to the mobile terminal. Referring back to FIG. 4, the mobile terminal then sends the coarse position 420 to the GPS receiver 430.

Figure 6:
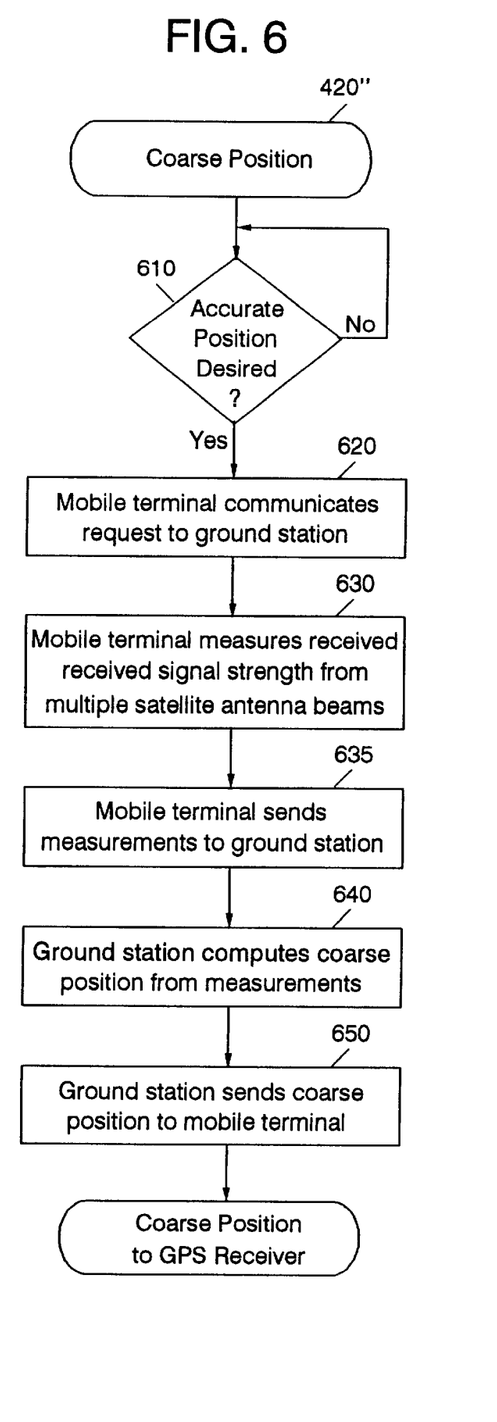

FIG. 6 illustrates a second embodiment of methods and systems for computing a coarse position of a mobile radiotelephone terminal. The coarse position determining embodiment 420" of FIG. 6 may be particularly useful when the satellite communication system employs a geostationary satellite. In this case, the coarse position of the user can be calculated by using the relative signal strengths (power) received by the mobile terminal from multiple satellite beams. This technique may provide an accuracy of a few kilometers. This coarse position information is provided to the GPS receiver so that the overall time and computation required for accurate position information may be reduced.

More specifically, referring to FIG. 6, when an accurate position is desired (Block 610), the mobile terminal communicates the request to the ground station at Block 620, so as to alert the ground station. At Block 630, the mobile terminal measures received signal strength (power) from multiple satellite antenna beams of the geostationary satellite. Then, at Block 635, the mobile terminal sends the measurements to the ground station, and at Block 640, the ground station computes the coarse position from these measurements. It will be understood that the mobile terminal itself may compute the coarse position from these measurements. At Block 650, if the ground station computed the coarse position, it sends the coarse position to the mobile terminal. The coarse position is then provided to the GPS receiver, as shown in FIG. 4.

Figure 7:
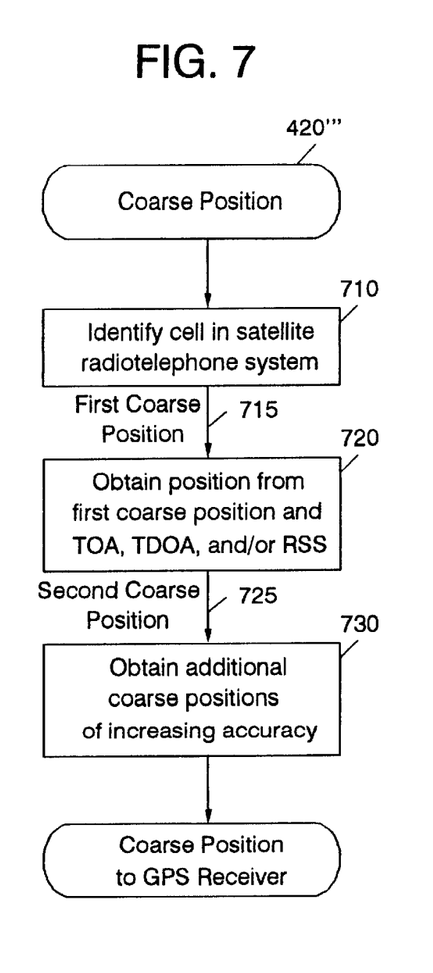

FIG. 7 illustrates a third embodiment for updating coarse position information for the mobile radiotelephone terminal 400. This technique repeatedly determines coarse positions of increasing accuracy, rather than obtaining a single coarse position. Thus, referring to FIG. 7, a coarse position 420''' according to the invention may be determined by identifying a cell in the satellite radiotelephone communication system at Block 710. This may provide a first coarse position 715 that may be several hundred kilometers wide. The first coarse position 715 is then used in conjunction with the satellite radiotelephone system at Block 720, to obtain a second coarse position 725 from the first coarse position 715 using TOA, TDOA and/or relative signal strength techniques as described. If desired, the second coarse position may be used to obtain additional coarse positions of increasing accuracy at Block 730. The final coarse position that is obtained is then provided to the GPS receiver 430 of FIG. 4. Intermediate coarse positions may also be provided. Thus, nested techniques may be used reduce the search space of the GPS receiver. These nested techniques may be used with other mobile radiotelephones such as terrestrial mobile radiotelephone systems.

Additional theoretical considerations and examples of the present invention will now be described. The accuracy of the computed position generally depends on the bandwidth of the satellite signals. If the satellite communication system is a narrowband system, the bandwidth of the signals may not result in satisfactory performance. For example, the Iridium satellite system has a bandwidth of 32.25 kHz which may make position accuracies of under 100 meters difficult to achieve. In this situation, it may be desirable for the mobile terminal to use signals from GPS satellites which have a bandwidth of 1.023 MHz. It is well known that position accuracies of under 100 meters can be achieved using GPS.

However, from a cold start, location of position using GPS can take a long time (on the order of minutes) since the GPS receiver in the mobile terminal begins with no knowledge of the timing or Doppler frequency of the satellite signals. Hence, the mobile terminal performs a time-frequency search to determine the time of arrival of up to four satellite signals before computing its position. This search space can be reduced considerably if the location of the user and the time of day are approximately known, i.e. a coarse position.

The knowledge of the satellite cell in which the user is located may be used to provide side information to the mobile terminal. In a satellite system however, the cell sizes are typically large. The cell diameters may be as high as 800 km as opposed to 70 km for cellular systems. This may limit the utility of the coarse position provided. For example, a beam diameter of 200 km, with a satellite elevation angle of 45 degrees would provide a time of arrival uncertainty of approximately 425 microseconds. The GPS signals are repetitive with a time period of 1 millisecond. The side information may only reduce the time uncertainty by half, although the Doppler uncertainty may be significantly reduced. As the beam diameter increases, the time information may become less useful and the frequency search space may grow considerably.

Assuming that the mobile terminal is already registered with the satellite communication system, it is generally synchronized to the control channel of one of the satellites. Also, the ground station that is communicating with this satellite knows the timing offset of this satellite in relation to the other satellites with which it is communicating. Therefore, the ground station can direct the mobile terminal to transmit a signal and direct multiple satellites to synchronize to the mobile terminal's signal. Based on the knowledge of the mobile terminal's cell location, the other satellites can be provided with a time uncertainty window within which to look for the mobile terminal's signal. From these time of arrival measurements to three communication satellites, a coarse position of the mobile terminal can be calculated.

The accuracy of this position is coarse due to the small signal bandwidth. However, the knowledge of the coarse position obtained can be utilized to provide the mobile terminal side information on the expected timing and Doppler frequency of the GPS satellite signals, thus allowing reduction of the search space for synchronization to these signals. The GPS signals may then be used to obtain position to a much higher accuracy. Moreover, the position using GPS can be computed faster than it could have been, if no coarse position information were available.

Once the beam in which the terminal is located is known, the time uncertainty that has to be resolved by the mobile terminal in synchronizing to a GPS satellite signal is generally of the same order as the time uncertainty to be resolved by a communication satellite in synchronizing to the mobile terminal's signal depending on the relative locations of the two satellites. However, since the bandwidth of the GPS signal is much higher, the complexity of this search in time for the GPS signal generally is proportionally higher.

For example, if the satellite communication system is assumed to be the Iridium system, the complexity of resolving the time uncertainty for the 1 MHz GPS signal as opposed to the 31.25 kHz Iridium signal is approximately 32 times. However, the accuracy of the determined time of arrival is also generally worse by a similar ratio. According to the invention, with the new knowledge of the coarse position, the time uncertainty to be resolved by the GPS receiver may be considerably reduced.

As a specific example, assume that both the narrowband system and GPS use the same sampling rate and correlate the received signal with sequences of the same length. Assume the time uncertainty window corresponds to a propagation distance of 200 km and let this window be split up into bins of 0.33 km each, which is roughly the distance corresponding to the chip period of a GPS satellite signal. Assume the computation required to compute the correlation value for each bin is X (the same for both systems under the present assumptions). Hence, to resolve the time uncertainty corresponding to 200 km, the GPS receiver performs 600X computations. Assuming that the satellite system signal bit period is 32 times larger, the number of bins searched by the receiver in correlating to the satellite signal is 200/(0.33·32)=600/32. Hence, the computation performed by the satellite signal receiver is 600X/32=18.75X.

When this information is provided to the GPS receiver, it only needs to search within the largest bin identified by the satellite signal receiver. Hence, the computation is 32X.

Therefore, the total computation when the satellite system and GPS are used together for determining the time of arrival is (18.75+32)X=50.75X as opposed to 600X if only the GPS receiver were used. It will be understood that some simplifying assumptions were made in this example to illustrate the principle. Additional gains may also be obtained since the search space for the Doppler frequency of each satellite may also be reduced. Therefore, the use of the two position location systems in a nested manner can reduce the time and computation to find the position of the mobile terminal to the accuracies obtained by using GPS. Accordingly, the computation and/or time to accurately locate the position of a mobile satellite communication terminal that is equipped with a GPS receiver may be reduced by obtaining a coarse position of the mobile radiotelephone terminal from satellite radiotelephone system communications.

It will also be understood that the present invention may be used with position determining systems other than GPS, to provide a coarse position and use the coarse position to reduce the search space for the position determining system. For example, in a radiotelephone system, the most accurate position computation system may be the radiotelephone system itself. Thus, the identity of a cell could be used as a first coarse position in order to reduce the search space to obtain an accurate position via the terrestrial radiotelephone system signals, especially when these signals have a high bandwidth. For example, the IS-95 system has a 1 MHz bandwidth and the third generation wideband CDMA system for Europe and Japan has a 5 MHz bandwidth.

In the drawings and specification, there have been disclosed typical preferred embodiments of the invention, and although specific terms are employed, they are used in a generic and descriptive sense only and not for purposes of limitation, the scope of the invention being set forth in the following claims.

What is claimed is:

1. A mobile radiotelephone terminal comprising:
   a satellite radiotelephone that obtains a coarse position of the mobile radiotelephone terminal from satellite radiotelephone system communications; and
   a global positioning system (GPS) receiver that uses the coarse position to determine an accurate position of the mobile radiotelephone terminal.

2. A mobile radiotelephone terminal according to claim 1 wherein the satellite radiotelephone obtains a coarse position of the mobile radiotelephone terminal by identifying a cell in a satellite radiotelephone system, within which the mobile radiotelephone terminal is located.

3. A mobile radiotelephone terminal according to claim 1 wherein the satellite radiotelephone obtains a coarse position of the mobile radiotelephone terminal from time of arrival information, time difference of arrival information or signal strength information in satellite radiotelephone system communications.

4. A mobile radiotelephone terminal according to claim 1:
   wherein the satellite radiotelephone obtains a coarse position of the mobile radiotelephone terminal by determining a first coarse position from the satellite radiotelephone system communications and by determining a second coarse position that is more accurate than the first coarse position, from the first coarse position and from the satellite radiotelephone system communications; and
   wherein the GPS receiver uses the second coarse position to determine an accurate position of the mobile radiotelephone terminal.

5. A mobile radiotelephone terminal according to claim 1 wherein the satellite radiotelephone obtains a coarse position of the mobile radiotelephone terminal by repeatedly determining coarse positions of increasing accuracy from the satellite radiotelephone system communications; and
   wherein the GPS receiver uses at least one of the coarse positions to determine an accurate position of the mobile radiotelephone terminal.

6. A mobile radiotelephone terminal according to claim 1 wherein the satellite radiotelephone obtains a coarse position of the mobile radiotelephone terminal by transmitting signals from the satellite radiotelephone to the satellite radiotelephone system and receiving the coarse position from the satellite radiotelephone system.

7. A mobile radiotelephone terminal according to claim 1 wherein the satellite radiotelephone obtains a coarse position of the mobile radiotelephone terminal by receiving signals from the satellite radiotelephone system and determining a coarse position from the received signals.

8. A position computation method for a mobile radiotelephone terminal that includes a satellite radiotelephone and a global positioning system (GPS) receiver, the position computation method comprising the steps of:
   determining a coarse position by the satellite radiotelephone from satellite radiotelephone system communications;
   providing the coarse position from the satellite radiotelephone to the GPS receiver; and
   using the coarse position by the GPS receiver to determine an accurate position of the mobile radiotelephone terminal.

9. A method according to claim 8 wherein the coarse position determining step comprises the step of identifying a cell in a satellite radiotelephone system, within which the mobile radiotelephone terminal is located.

10. A method according to claim 8 wherein the coarse position determining step comprises the step of obtaining a coarse position of the mobile radiotelephone terminal from time of arrival information, time difference of arrival information or signal strength information in satellite radiotelephone system communications.

11. A method according to claim 8 wherein the coarse position determining step comprises the steps of:
    determining a first coarse position from the satellite radiotelephone system communications; and
    determining a second coarse position that is more accurate than the first coarse position, from the first coarse position and from the satellite radiotelephone system communications; and
    wherein the providing step comprises the step of providing the second coarse position to the GPS receiver.

12. A method according to claim 8 wherein the coarse position determining step comprises the steps of:
    repeatedly determining coarse positions of increasing accuracy from the satellite radiotelephone system communications; and
    wherein the providing step comprises the step of providing at least one of the coarse positions to the GPS receiver.

13. A mobile radiotelephone terminal comprising:
    a mobile radiotelephone that repeatedly obtains coarse positions of increasing accuracy from mobile radiotelephone system communications to obtain a final coarse position of the mobile radiotelephone terminal; and
    a global positioning system (GPS) receiver that uses the final coarse position to determine an accurate position of the mobile radiotelephone terminal.

14. A mobile radiotelephone terminal according to claim 13 wherein the mobile radiotelephone repeatedly obtains coarse positions of increasing accuracy from at least one of identification of a cell in the mobile radiotelephone communications system within which the mobile radiotelephone is located, time of arrival information, time difference of arrival information and signal strength information in mobile radiotelephone system communications.

15. A position determining method for a mobile radiotelephone terminal comprising the step of:

repeatedly obtaining positions of increasing accuracy from mobile radiotelephone system communications to obtain a final position of the mobile radiotelephone terminal.

16. A method according to claim 15 wherein the mobile radiotelephone repeatedly obtains positions of increasing accuracy from at least one of identification of a cell in the mobile radiotelephone communications system within which the mobile radiotelephone is located, time of arrival information, time difference of arrival information and signal strength information in mobile radiotelephone system communications.

17. A mobile radiotelephone terminal comprising:

means for obtaining a coarse position of the mobile radiotelephone terminal from mobile radiotelephone system communications; and means for using the coarse position to determine an accurate position of the mobile radiotelephone terminal.

18. A mobile radiotelephone terminal according to claim 17 wherein the obtaining means comprises means for identifying a cell of a mobile radiotelephone system in which the mobile radiotelephone is located, and wherein the means for using comprises a wideband CDMA transceiver.

\* \* \* \* \*